(12) United States Patent
Itoh

(10) Patent No.: US 8,768,896 B2
(45) Date of Patent: Jul. 1, 2014

(54) SETTING INFORMATION DATABASE MANAGEMENT

(75) Inventor: Hiroshi Itoh, Kanagawa-Ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 568 days.

(21) Appl. No.: 12/871,313

(22) Filed: Aug. 30, 2010

(65) Prior Publication Data

US 2011/0055278 A1 Mar. 3, 2011

(30) Foreign Application Priority Data

Aug. 31, 2009 (JP) ................................ 2009-199513

(51) Int. Cl.
*G06F 17/30* (2006.01)

(52) U.S. Cl.
USPC .......................................... 707/692; 707/609

(58) Field of Classification Search
USPC ......... 707/609, 655, 656, 657, 659, 660, 674, 707/679, 692, 785, 821, 639, 670; 709/224; 717/168–178
See application file for complete search history.

(56) References Cited

U.S. PATENT DOCUMENTS

| | | | | |
|---|---|---|---|---|
| 6,029,246 | A * | 2/2000 | Bahr .................................. | 726/4 |
| 6,434,744 | B1 * | 8/2002 | Chamberlain et al. ........ | 717/168 |
| 7,188,116 | B2 * | 3/2007 | Cheng ........................... | 707/692 |
| 7,865,461 | B1 * | 1/2011 | Best et al. ...................... | 707/610 |
| 8,055,630 | B2 * | 11/2011 | Dawson et al. ................ | 707/674 |
| 8,301,767 | B1 * | 10/2012 | Davis et al. .................... | 709/225 |
| 2006/0218026 | A1 * | 9/2006 | Osborne .......................... | 705/8 |
| 2011/0225128 | A1 * | 9/2011 | Jarrett et al. ................... | 707/692 |

FOREIGN PATENT DOCUMENTS

| | | |
|---|---|---|
| JP | H07-056719 | 3/1995 |
| JP | H09-146764 A1 | 6/1997 |
| JP | 2000-112716 A1 | 4/2000 |
| JP | 2003-186676 A1 | 7/2003 |
| JP | 2005-078628 | 3/2005 |

* cited by examiner

*Primary Examiner* — Greta Robinson
(74) *Attorney, Agent, or Firm* — Ference & Associates LLC

(57) ABSTRACT

Computer programs, methods and systems for managing a setting information database of a computer system are described. The computer system includes an original setting information database and an administrative database which store setting information of the system. Each time a write request to write data to the setting information database is received from a requester, a write processing portion writes the requested data to the administrative database. When a read processing portion receives a read request to read data from the setting information database, if the data is included in the administrative database, the read processing portion passes the data from the administrative database to the program that issued the read request. An editing portion cleans up the administrative database using a white list to ensure that only a trusted program can write data.

20 Claims, 10 Drawing Sheets

SETTING INFORMATION DATABASE MANAGEMENT

CLAIM FOR PRIORITY

This application claims priority from Japanese Patent Application No. 2009-199513, filed on Aug. 31, 2009, and which is fully incorporated by reference as if set forth herein.

FIELD OF THE INVENTION

The subject matter described herein relates to a technology for suitably managing a setting information database used in a computer system, and more particularly to a technology for maintaining a stable operation of a computer system.

BACKGROUND

A WINDOWS (registered trademark of Microsoft Corporation in the United States and other countries) operating system (OS) has built therein a database called a system registry (hereinafter, simply referred to as a "registry") into which setting information of hardware and software is registered. The WINDOWS registry has five root keys and a plurality of subkeys hierarchically associated with each of the root keys. Each end subkey has an entry including a setting name and a setting value described therein.

A computer system can operate normally as various programs read the setting information in the registry when the system is started or while the system is running The registry is updated for example when an application program is installed or uninstalled, when the OS is updated, or when the system environment settings are changed. Further, a user can use a program called a registry editor to customize the registry. The computer system may operate unstably or unexpectedly if a user updates the registry incorrectly or malware tampers with the registry.

In order to restore the functions of the computer system of which operation has become unstable due to a change of the registry, WINDOWS OS uses a system restore application. The system restore application generates snapshots of the entire registry in chronological order, so as to allow the state of the entire registry to be returned to the state at a certain restore point in the past. There also is a method of deleting data that has been tampered by a process registered in a black list, by means of cleanup software or spyware disinfecting software. Japanese Unexamined Patent Publication No. 2005-078628 teaches a system that provides an access to information stored in a registry and dynamically partitions the registry. In the system of the Japanese Unexamined Patent Publication No. 2005-078628, a dynamic partition data store stores redirection information associated with an application and the registry, and in response to a request from the application, it provides information associated with the registry on the basis of the redirection information. Japanese Unexamined Patent Publication No. 7-056719 teaches a method of initializing and updating a registry in order to ensure the boot of a computer.

The above-described method of returning the setting values in the entire registry back to those at the restore point on the basis of the snapshot takes a long time to process. The properly updated entries will also be returned to the previous values, which may impose an inconvenience on a user.

BRIEF SUMMARY

One aspect provides a computer program product comprising: a computer readable storage medium having computer readable program code embodied therewith, the computer readable program code comprising: computer readable program code configured to provide an administrative database capable of storing setting information of a computer system; computer readable program code configured to, responsive to reception of each write request to write data to a setting information database of the computer system, append write data of each write request to the administrative database instead of writing the data to the setting information database; and computer readable program code configured to, responsive to reception of a read request to read data from the setting information database, provide read data from the administrative database responsive to a determination that the administrative database includes the read data therein.

Another aspect provides a computer system comprising: one or more processors; a system memory operatively connected to the one or more processors; a setting information database for storing key data, the key data including a key path and a setting value for the key path; an administrative database for storing updated key data in correspondence with the key data stored in the setting information database; a plurality of requesters configured to access the setting information database; and a write processing module configured to write key data to the administrative database on receipt of a write request to write data to the setting information database issued from one of the plurality of requesters.

A further aspect provides a method comprising: operating one or more processors to: provide an administrative database capable of storing setting information of a computer system; responsive to reception of each write request to write data to a setting information database of the computer system, append write data of each write request to the administrative database instead of writing the data to the setting information database; and responsive to reception of a read request to read data from the setting information database, provide read data from the administrative database responsive to a determination that the administrative database includes the read data therein.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of example embodiments.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation. It will be readily understood that the methods, systems, computer program products, and apparatuses described in detail herein simply represent example implementations and use contexts, and that the embodiments are equally applicable to other implementations and use contexts.

Figure 11:
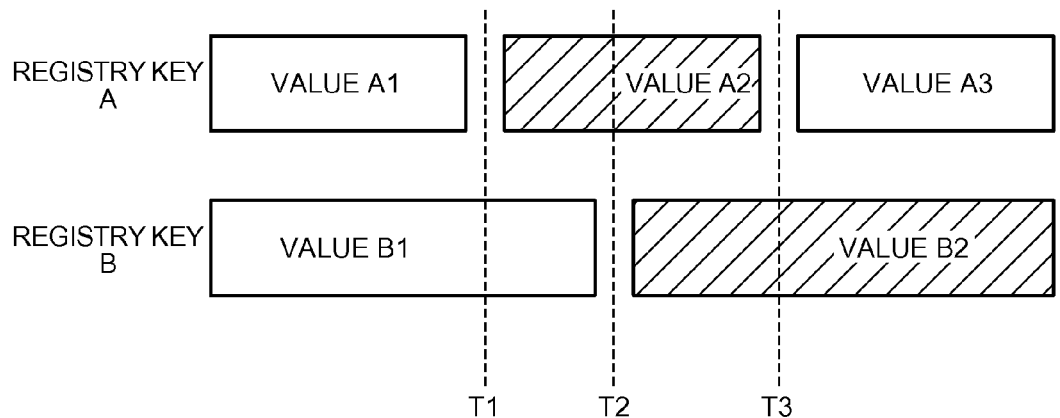
FIG. 11 illustrates a method of updating a registry by a conventional snapshot-type restore.

Returning the setting values in the entire registry back to those at the restore point on the basis of the snapshot takes a long time to process. The properly updated entries will also be returned to the previous values, which may impose an inconvenience on a user. For example, referring to FIG. 11, it is assumed that a registry key A has been changed from a value A1 to a value A2 and to a value A3 in chronological order and a registry key B has been changed from a value B1 to a value B2. Here, the values A2 and B2 are tampered with by malware, and the system currently uses the values A3 and B2 to operate. Snapshots of the overall registry keys have been taken at times T1, T2, and T3.

Now, suppose that the system is operating unstably due to the value B2 and that the user tries to return the values in the registry to those at one of the restore points. If the time T1 is selected as the restore point, the value of the registry key A will be changed to the value A1, and the value of the registry key B will be changed to the value B1. In this case, although the registry key B may be restored to the correct setting value (i.e. value B1), the setting value of the registry key A will be returned to the value A1 that was suitable in the past, instead of the latest value A3 that is currently suitable. As a result, the value A3 that is currently the most suitable setting value for the user will be lost.

If the time T2 is selected as the restore point, the value of the registry key A will be changed to the value A2, and the value of the registry key B will be changed to the value B1. In this case, although the registry key B may be restored to the correct setting value (i.e. value B1), the setting value of the registry key A will be returned to the unsuitable value (i.e. value A2). Even though the system was operating normally when the snapshot was created at the time T2, the system may have potentially included factors of instability due to the value A2. It is thus undesirable to return the value to the value A2. Furthermore, with the value A2, the computer system may not operate normally, in which case a certain type of application will have to be reinstalled in order to set the setting value to the value A3. If the time T3 is selected as the restore point, the value of the registry key A will be changed to the value A3, and the value of the registry key B will be changed to the value B2. In this case, the registry keys A and B have the same values as those before being restored. A user can only select a restore point. Thus, when the user selects the time T3, the same state as that before being restored is continued, with the problem remaining unsolved.

In this system, it is desirable that the setting value of the registry key A is set to the value A3 and the setting value of the registry key B is set to the value B1. The method using snapshots, however, cannot restore the values on the registry key basis. It will be difficult for a user without expertise to select and modify a defective registry key. Furthermore, as the time elapses from the start of the operation of the computer system, the amount of data the registry contains therein will increase more and more, causing the computer system to have a huge amount of snapshots. The method of performing a cleanup using the snapshots is unable to restore all the setting values to the latest, suitable values, and in addition, it requires generally a long processing time as well as dedicated software.

The method using a black list assumes that any setting values already set are legal. When an illegal program is found afterwards, the method deletes a setting value that has been written by that program. The method using a black list cannot address the values in the registry that have been written by a program not registered in the black list. The computer system will accept tampered values until an illegal program is registered in the black list. Such a slow response may lead to immense damages. In order to protect against tampering using a black list, it is necessary for cleanup software to actually update the information in the black list. The cleanup software does not manage which program has rewritten or tampered with the registry. Thus, while the software may remove a tampered with setting value on the basis of the black list, it cannot restore that value to a suitable setting value.

Accordingly, embodiments provide for a computer program for suitably managing a setting information database of a computer system. Another aspect provides a program that is able to easily initialize a setting information database. Another aspect provides a program that is able to suitably clean up a setting information database. Another aspect provides a program that quickly suppresses an unstable operation of the system caused by tampering of a setting information database. Yet another aspect is to provide a computer system implemented by such a program.

A computer according to embodiments operates using a setting information database that stores setting information of a system. The setting information database may be provided within a physical body of a computer that uses the database, or in an environment in which it can be accessed through a network. Various programs operating on the computer can access the setting information database for reading or writing. For accessing the setting information database, an executable unit of the program, such as a task, a process, or a thread, may be generated. In embodiments, the programs accessing the setting information database include a part of an OS, an application installed into the computer as a program operating on the OS, and a device driver which controls a device.

A computer program according to embodiments provides a computer with an administrative database which stores setting information of a system that is to be added to the setting information database. Each time a write request to write data to the setting information database is received, the computer program appends (as to the database as opposed to overwrites) write data to the administrative database, instead of writing it to the setting information database. When a read request to read data from the setting information database is received, the computer program provides read data from the administrative database in the case where the administrative database includes the read data.

Embodiments describe that the setting information database is not updated. Accordingly, any data stored under a trusted system state guaranteed by a manufacturer, e.g. just after shipment or complete initialization of a computer, can be kept unchanged. Write data is appended, so that the administrative database can store old data before an update as well. With this configuration, reliability of the setting information database can be maintained. In the event of a malfunction of the computer, the computer can readily be restored to a trusted initial state by removing the data in the administrative database.

In a case where the administrative database does not include the read data, the program returns the data from the setting information database. Initially, the administrative database may have no stored data. In this case, upon the very first write request, the data corresponding to the read request may not be stored in the administrative database. The data however can be returned from the setting information database, so that the computer can operate normally.

The program according to embodiments can provide a white list that registers a trusted program or process in terms of access to the setting information database. A program installed before shipment can be considered to be trusted. The first time a program not registered in the white list writes data into the administrative database, that program is added to list of programs in the white list. In one non-limiting example, an update of the white list may be requested when a user used the computer for a predetermined period and has confirmed that a system operates normally or when a system monitoring the operation state of the computer has detected no unstable operation of the computer for a predetermined period.

The program according to embodiments can remove from the administrative database any data written by a program not described in the white list, in response to a cleanup request to clean up the administrative database. The user, upon use of the computer for a predetermined period may determine that a computer does not operate properly and can request a cleanup. Alternatively, a system monitoring the computer for an unstable operation may request a cleanup.

The program according to embodiments can remove all the data in a specific category that was written into the administrative database, in response to an initialization request to initialize the administrative database. The specific category may be, but is not limited to, a driver, service, security, or an application. As a result, when a computer does not operate properly, only the data in a category that is associated with a specific problem may be removed, leaving in tact data in the problem free category or categories. This is easier than initializing the administrative database by removing all the data therefrom, and in addition, it can hold the system in a condition that is closer to the current good condition.

Thus, embodiments provide a program for suitably managing the setting information database of a computer system.

Further, embodiments provide a program for easily initializing the setting information database. Furthermore, embodiments provide for a program for suitably cleaning up the setting information database. Furthermore, embodiments provide a program for quickly suppressing an unstable operation of the system caused by tampering with the setting information database. Still further, embodiments provide a computer system implemented by such a program.

The following describes an embodiment of a computer program and system in detail, with reference to drawings. Note that the embodiments are not limited to this embodiment. Moreover, components in the embodiment described below include components easily assumed by a person skilled in the art or substantially same components.

Figure 1:
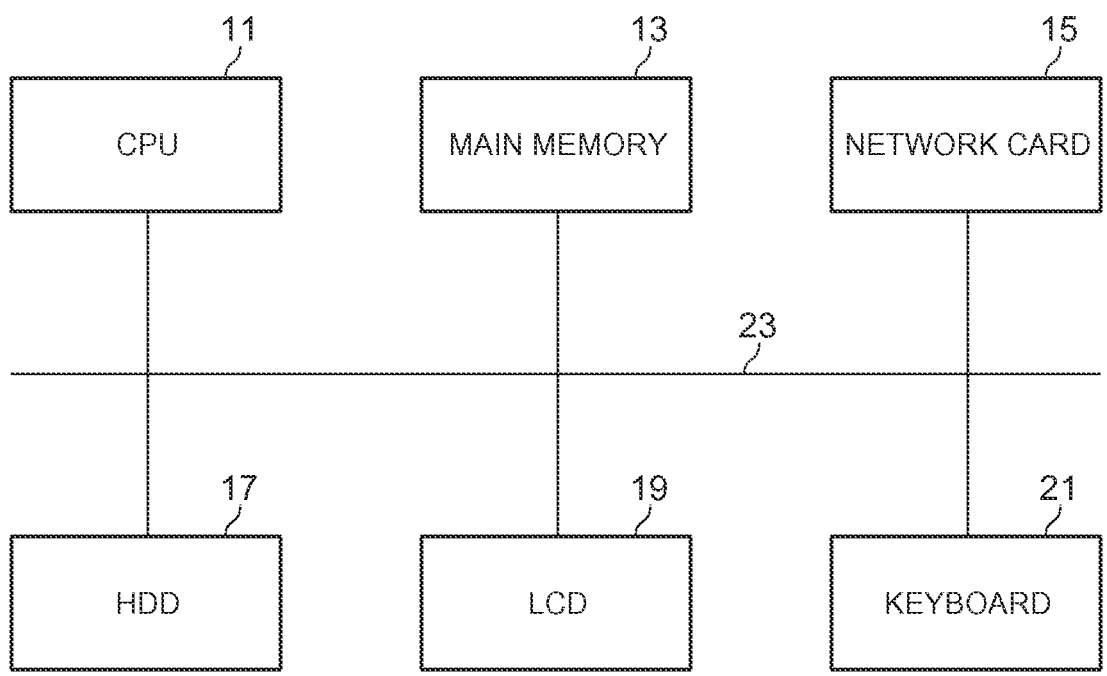
FIG. 1 illustrates a functional block diagram showing a main hardware configuration of a computer system.

Referring now to FIG. 1, therein is a functional block diagram showing a main hardware configuration of a computer system 10 illustrated by way of example in the present embodiment. The computer system 10 is a server or a client installed with an OS. The computer system 10 includes a CPU 11, a main memory 13, a network card 15, a HDD 17, a liquid crystal display (LCD) 19, and a keyboard 21, each connected to a bus 23. The functions of these hardware devices in relation to the present embodiment are well known and, therefore, description thereof will not be provided here.

Figure 2:
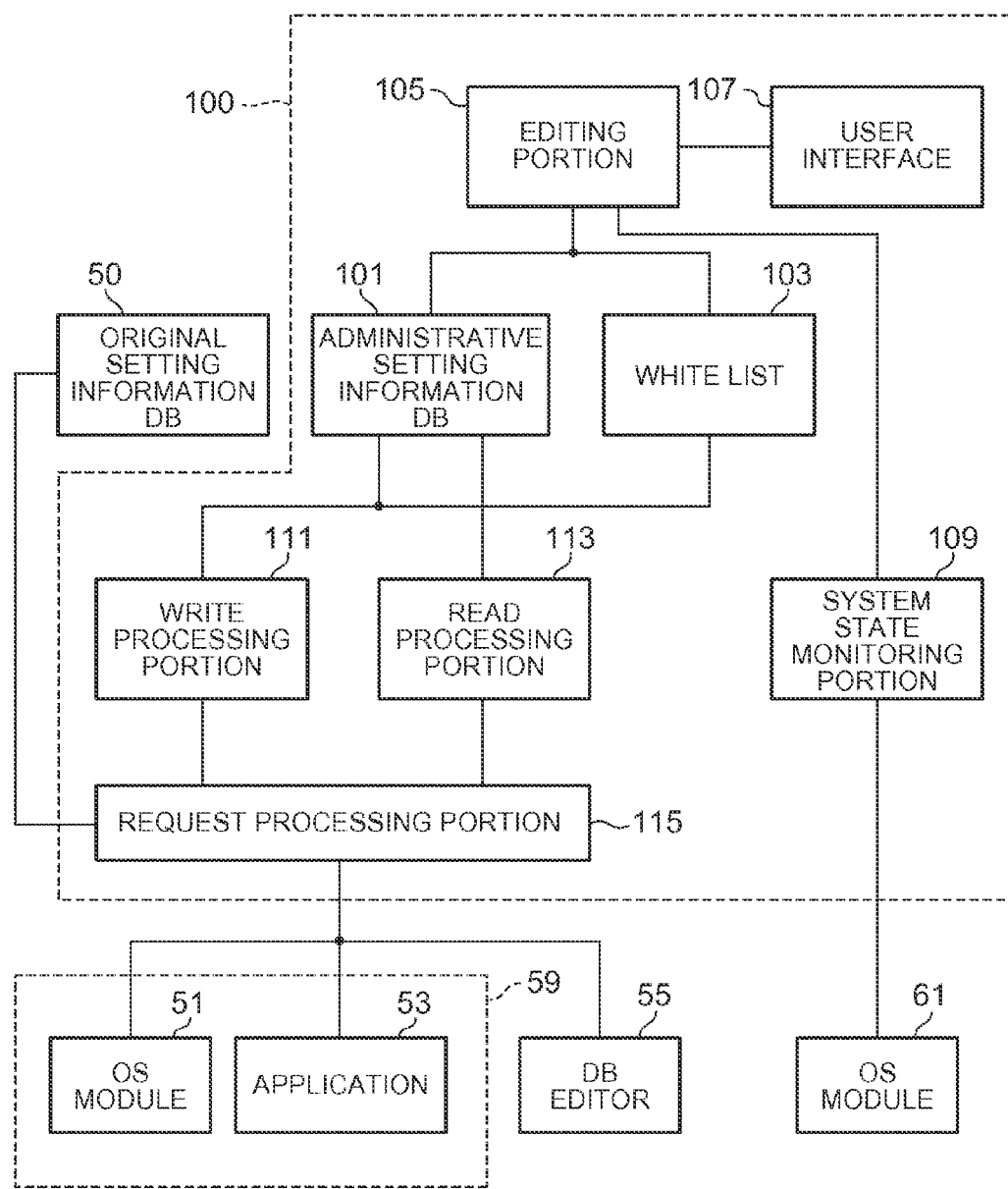
FIG. 2 illustrates a functional block diagram showing a configuration of software implemented in the computer system.

FIG. 2 is a functional block diagram showing a configuration of program modules implemented in the computer system 10. The software modules shown in FIG. 2 include a management program module group 100 and another well-known program module group, which are stored in the HDD 17. The program modules shown in FIG. 2 also include a collection of data falling under the categories of database and file. The functions of the program modules shown in FIG. 2 are provided in the state where the program that has been loaded from the HDD 17 into the main memory 13 is being executed, or executable, in the CPU 11. The program modules are implemented when a part of an OS directly works on the CPU 11, the main memory 13, the bus 23, and others, or when an application uses a service of the OS to work thereon. The well-known program module group includes an original setting information database (DB) 50, an OS module 51, an application 53, a database editor (DB editor) 55, and an OS module 61.

The original setting information DB 50 is built in as a part of the OS, and registers therein configuration information of hardware, setting information of a device driver, setting information of the OS, environmental information of an application program, management information of the system, file association information, security information, and the like. In a WINDOWS OS, a database in which such information is registered is called a registry. The original setting information DB 50 according to the embodiments may be provided in such a form that it is connected to the computer system 10 via a network. The OS module 51 and the application 53 access the original setting information DB 50 to update or refer to the data.

The DB editor 55 is a program for displaying an editing screen for the original setting information DB 50 or an administrative setting information database (DB) 101 (which will be described later) on the LCD 19 so as to allow a user to edit data in that database. The OS module 61 is a program for detecting an error that may cause an unstable operation of the computer system 10, to inform the system state monitoring portion 109 of the error. The error that may cause an unstable operation is displayed for example as a screen called a blue screen. Examples of errors include but are not limited to a running process or driver has accessed a memory area with no access permission; the CPU has issued an invalid instruction; or security can no longer be maintained.

The OS module 51 has been installed as a part of the OS under a trusted environment before or after shipment of the computer system 10, and is regarded as a trusted program which requests a rewrite of data to the original setting information DB 50. The application 53, for the purposes of operating under the computer system 10, registers setting information related to the application 53 in the original setting information DB 50, and operates by referring to that setting information. It is here assumed that the application 53 may possibly be a program that is installed to the computer system 10 without the user's intent and is attempting to tamper with data in the original setting information DB 50. In the following description, the OS module 51 or the application 53 may be called a requester 59. The management program module group 100 includes the administrative setting information DB 101, a white list 103, an editing portion 105, a user interface 107, a system state monitoring portion 109, a write processing portion 111, a read processing portion 113, and a request processing portion 115.

The request processing portion 115, on receipt of an access request to access the original setting information DB 50 issued by the requester 59, determines the content of the access request and passes the same to one of the write processing portion 111, the read processing portion 113, or the original setting information DB 50. Specifically, when the request issued by the requester 59 to the original setting information DB 50 relates to creation of a key path in the DB 50, writing of a setting value thereto, or deletion of a setting value therefrom, then the request processing portion 115 passes the request to the write processing portion 111. When the request relates to reading of a setting value from the original setting information DB 50, the request processing portion 115 passes the request to the read processing portion 113. The request processing portion 115 passes the other requests to the original setting information DB 50. The above-described function of the request processing portion 115 can be implemented for example by monitoring OS service functions that are used for the requester 59 to access the original setting information DB 50, catching only the service functions related to creation of a key path, writing of a setting value, and reading of a setting value so as to pass them to the write processing portion 111 or the read processing portion 113, and by passing the remaining service functions to the original setting information DB 50. Thus, for achieving embodiments, there is no need to change the service functions that have been used for the requester 59 to access the original setting information DB 50. In WINDOWS OS, the service functions to be caught may include: RegCreateKeyEx, RegDeletekey, RegGetValue, RegQueryValueEx, and RegSetKeyValue.

The write processing portion 111, when a write request to write data to the original setting information DB 50 is received from the request processing portion 115, writes any data associated with the write request into the administrative setting information DB 101. It is noted that the write request may include, but not be limited to, a request to delete a key path or a setting value. In writing data into the administrative setting information DB 101, the write processing portion 111 checks whether the requester 59 has been registered in the white list 103, to also write the result therein. The read processing portion 113, when a read request to read a setting value from the original setting information DB 50 is received from the request processing portion 115, determines whether the administrative setting information DB 101 has the requested setting value therein. In the case where the administrative setting information DB 101 stores the requested setting value as part of a time-series data unit 151$n$, the read processing portion 113 reads the setting value therefrom, and returns it to the requester 59 via the request processing portion 115.

In the case where the requested setting value is not in the administrative setting information DB 101, the read processing portion 113 notifies the request processing portion 115 to that effect. Then, the request processing portion 115 passes that request to the original setting information DB 50. The administrative setting information DB 101 reflects any write requests to the original setting information DB 50 that have been issued after the start of the operation of the management program module group. Initially, the administrative setting information DB 101 is an empty database. Each time the requester 59 issues a write request to write data to the original setting information DB 50, the administrative setting information DB 101 registers therein the write data and information on the requester. When the requester 59 issues a read request to read data from the original setting information DB 50, in the case where the administrative setting information DB 101 stores data matching the request, the administrative setting information DB 101 returns the data to the requester 59 via the request processing portion 115.

The white list 103 is a list in which a process generated by a trusted program is registered as an attribute of the process. The white list 103 initially registers only the processes that have been generated by the initially installed and trusted programs, including, but not limited to, a system process implementing the OS function, a module built in as a part of the OS from the beginning, and an application installed together with the OS. The DB editor 55 may be configured to prevent data from being registered in the white list 103 at any time, in order to address an incorrect update of the registry by a user. In this manner, the white list 103 assures reliability of the processes, or the programs that generated the processes, initially registered therein. A method of maintaining reliability of a process that is subsequently registered in the white list 103 will be described later. The editing portion 105 cleans up or initializes the administrative setting information DB 101 on the basis of a cleanup request or a white list update request received from the user interface 107 or the system state monitoring portion 109. The user interface 107 is a program which displays upon a user's request an operation screen on the LCD 19, or at regular intervals such as once a week, queries a user to determine whether to clean up or initialize the administrative setting information DB 101 or update the white list 103 so as to execute the operation.

In one non-limiting example, after a new program has been downloaded to the computer system 10 via a network, a user may find that a program response is slower, boot time is longer, or the computer system exhibits suspicious behavior. In such a case, the user can clean up or initialize the administrative setting information DB 101 to restore the computer system to the state in which the computer system was stable. A user may monitor the operation of the computer system 10 for a predetermined period and when a user determines that a program for the process that has written data into the administrative setting information DB 101 is safe, the user can instruct the user interface 107 to register the process in the white list 103.

When a user issues a request to clean up the administrative setting information DB 101, the user interface 107 notifies the editing portion 105 to that effect. The system state monitoring portion 109 monitors boot time of the computer system 10 and execution time of a specific program, and when these times each become longer than a predetermined value, it issues a request to clean up the administrative setting information DB 101 to the editing portion 105. The system state monitoring portion 109 also issues the request to clean up the administrative setting information DB 101 to the editing portion 105 when it receives from the OS module 61 a notification that the computer system 10 is operating unstably. Another example where the system state monitoring portion 109 might issue a clean up request would be if the CPU usage of a specific program has remained 100% for a predetermined time, or historically a program regarded as an unstable program by a user was repeatedly stopped by a task manager. On the other hand, when no such notification of an unstable operation of the computer system 10 has been received from the OS module 61 for a predetermined period, the system state monitoring portion 109 issues a request to update the white list 103 to the editing portion 105.

The configuration of the management program module group 100 shown in FIG. 2 is a non-limiting example. The modules illustrated therein may be integrated or split. An operating environment of each module may be in user mode or in kernel mode. Each of the modules may be an application operating on an OS, or a kernel or a driver built in as a part of the OS. Any software that implements the functions of the management program module group 100 shown in FIG. 2, including the modules of any names or any combination thereof, falls within the scope of the embodiments.

Configuration of Original Setting Information DB

Figure 3:
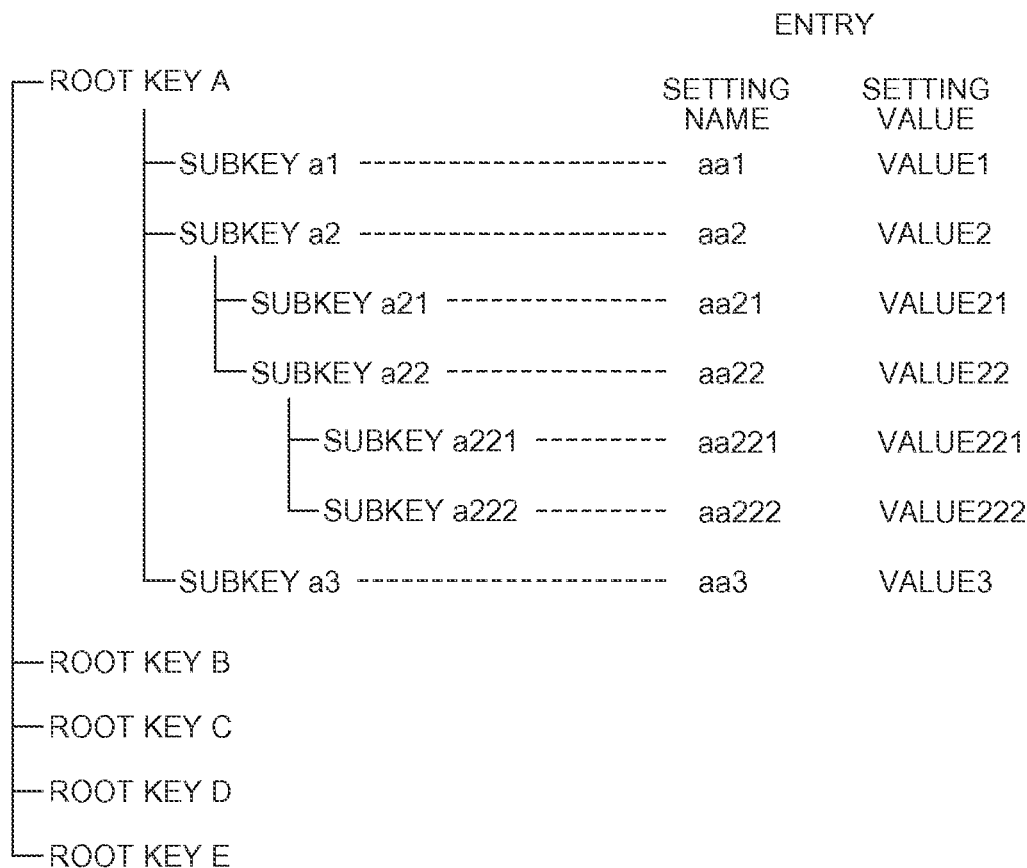
FIG. 3 illustrates a configuration of an original setting information database.

FIG. 3 shows one example of a configuration of the original setting information DB 50. The original setting information DB 50 includes root keys A to E and subkeys belonging to the respective root keys. The root keys and the subkeys are identification symbols that classify the setting information and show the storage locations. Each subkey is linked to a root key, a higher subkey, or a lower subkey in a hierarchical structure. Hereinafter, the lowest subkey is referred to as a "tail key", and a link structure from a tail key to a root key is referred to as a "key path". Each tail key is associated with a setting name and a setting value. Hereinafter, a combination of a setting name and a setting value is referred to as an "entry", and a combination of a key path and an entry for a certain tail key is referred to as "key data". The setting value may include information on a data type of the setting value.

Configuration of Administrative Setting Information DB

Figures 4A, 4B:
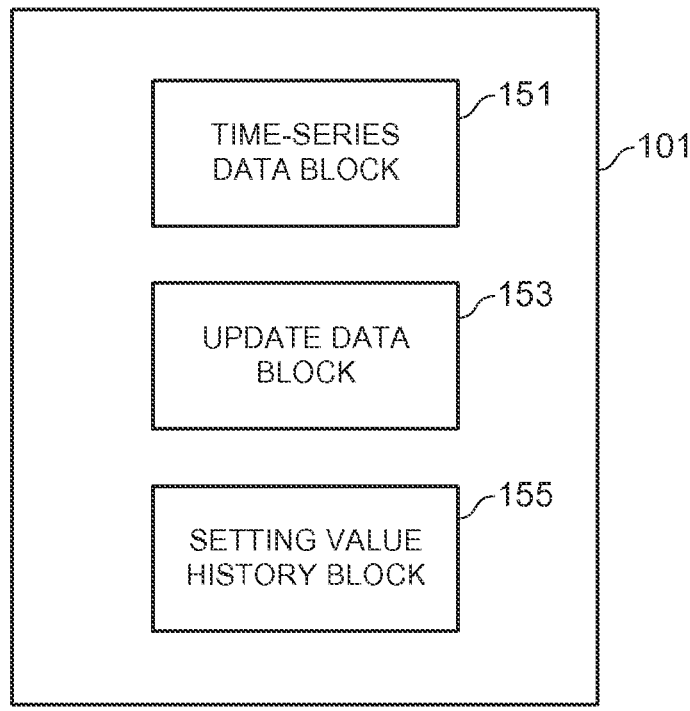
FIGS. 4A, 4B, and 5 illustrate a configuration of an administrative setting information database.

FIGS. 4A and 4B show a configuration of the administrative setting information DB 101. FIG. 4A shows the entire configuration of the administrative setting information DB 101. The administrative setting information DB 101 is composed of a time-series data block 151, an update data block 153, and a setting value history block 155. FIG. 4B shows a data structure of a time-series data unit 151$n$ which is one unit or one entry of data included in the time-series data block 151. The time-series data unit 151$n$ includes: information about the time when the write processing portion 111 wrote data on the basis of a write request from the requester 59; information about the write data; and information about the process or program that requested the data writing. The information about the time when the write processing portion 111 wrote data includes the date and time of writing, a GUID which uniquely identifies the time-series data unit 151$n$, and whether the process that requested the data writing is registered in the white list 103. The information about the write data includes a key path and an entry. The information about the process or program that requested the data writing includes a name of the process, a name of the account that used the program, a file size of the program, version information, and a file path indicating the storage location.

Figure 5:
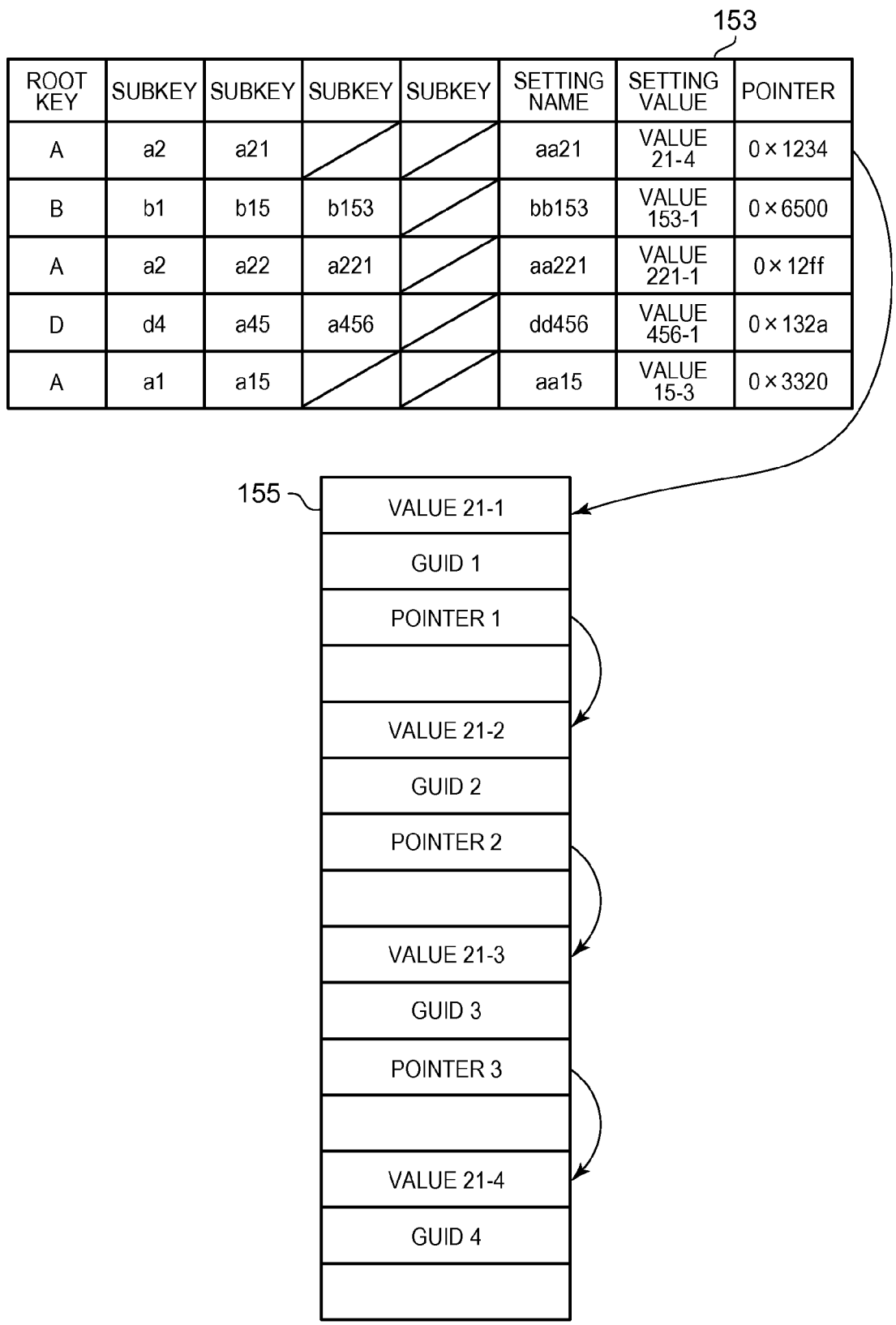

Each time the requester 59 requests a write to the original setting information DB 50, a time-series data unit 151$n$ is added to the time-series data block 151 in time series. The added time-series data unit 151$n$ is stored in the time-series data block 151 until a cleanup is requested, as will be described later. FIG. 5 shows data structures of the update data block 153 and the setting value history block 155. The update data block 153 has a list structure, in which each record includes a key path (a root key and one or more subkeys), an entry (a setting name and a setting value), and a pointer to a predetermined address in the setting value history block 155. In the setting value history block 155, one entry corresponding to one record in the update data block 153 is composed of a setting value, a Globally Unique Identifier ("GUID"), and a pointer, and the entries are added in order of time in which the time-series data unit 151$n$ were registered in the time-series data block 151.

The write processing portion 111 updates the update data block 153 and the setting value history block 155 when it has written a new time-series data unit 151$n$ into the time-series data block 151. When the write processing portion 111 has written into the time-series data block 151 a time-series data unit 151$n$ related to new key data that has not been registered in the update data block 153, the write processing portion 111 registers in the update data block 153 key data made up of a key path and an entry. In the case where a setting value for the same tail key is written twice to the update data block 153, the write processing portion 111 adds the second setting value and its GUID to the setting value history block 155 and registers a pointer to the setting value history block 155 in the update data block 153. In the case where a setting value associated with the same tail key is added three or more times, the write processing portion 111 registers each setting value in the setting value history block 155 by linking it to the previous setting value by a pointer. The write processing portion 111 always replaces the setting value in the update data block 153 with the most recent setting value.

In FIG. 5, in the update data block 153, a setting name "aa21" and a setting value "value 21-4" are registered as an entry for the tail key "a21". The setting value history block 155 indicates that for the setting name "aa21", the setting value has been additionally written four times, which is represented as "value 21-1", "value 21-2", "value 21-3", and "value 21-4". Each time a setting value for the same tail key is changed, the write processing portion 111 registers the changed setting value in the setting value history block 155. The write processing portion 111 also replaces the setting value in the update data block 153 with the latest setting value. In FIG. 5, "value 21-4" is the latest setting value, and thus, in the update data block 153, "value 21-4" is registered as the setting value in correspondence with the setting name "aa21".

Configuration of White List

Figure 6:
FIG. 6 illustrates a data structure of a white list.

FIG. 6 shows a data structure of the white list 103. The white list 103 registers therein attributes of the processes generated by trusted programs. Each record in the white list 103 includes a process name, a file size of the program that generated the process, a file path indicating the location where the program is stored, version information of the program, and a date and time of registration in the white list 103. In the white list 103, the OS or an application installed together with the OS is registered initially. Thereafter, among the programs specified in the time-series data units 151$n$ written into the time-series data block 151, only a program recognized as reliable by the computer system 10 or a user is added to the white list 103. A method of recognizing the reliability will be described later.

When writing a time-series data unit 151n into the time-series data block 151, the write processing unit 111 checks whether the information about the process generated by the requester 59 matches the items specified in the white list 103. In the case where they match completely, the write processing portion 111 determines that the writing has been executed by a process registered in the white list 103, and describes a term "known" in the field of "registration in white list" in the time-series data unit 151n. In the case where they do not match completely, the write processing portion 111 determines that the writing has been executed by a process not registered in the white list 103, and describes a term "unknown" in the field of "registration in white list".

Procedure for Managing Registry

FIGS. 7 to 10 are flowcharts illustrating a procedure for managing the original setting information DB 50 by the management program module group 100. In step 201 in FIG. 7, the computer system 10 is turned on, so that the programs, databases, files, and others shown in FIG. 2 are loaded into the main memory 13. It is here assumed that a plurality of pieces of key data have been registered in the administrative setting information DB 101 by the write processing portion 111.

Figure 7:
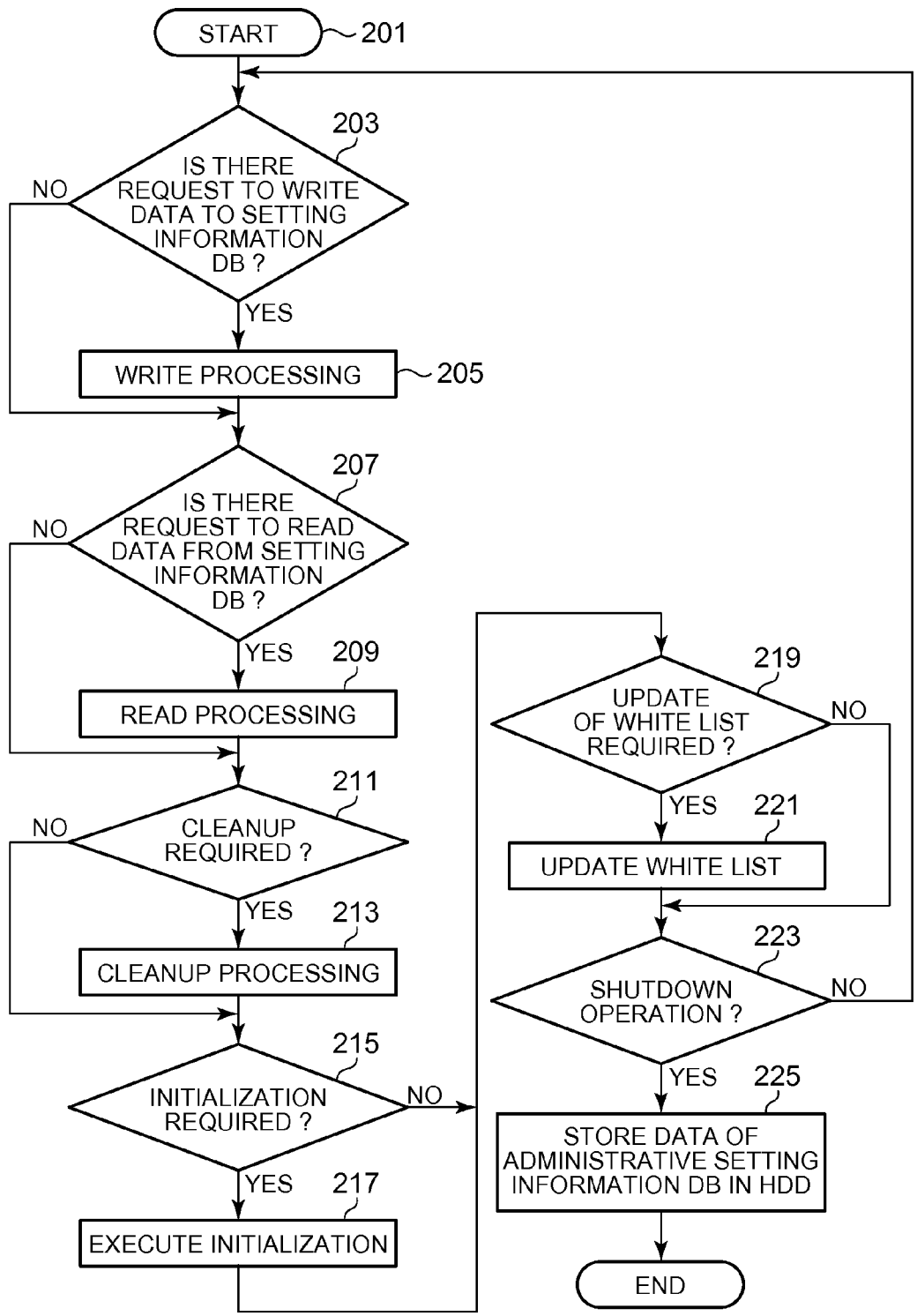
FIG. 7 illustrates a flowchart for a procedure for managing the original setting information database.
Figure 8:
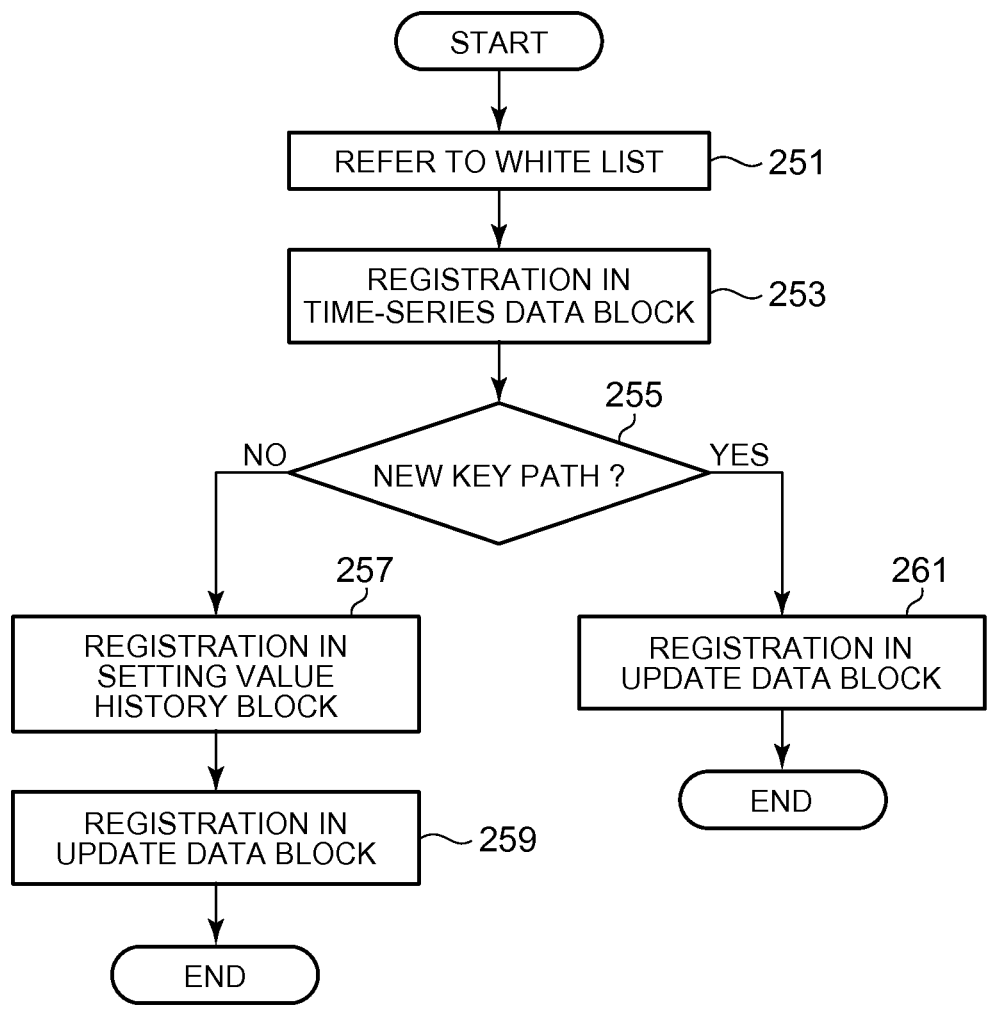
FIG. 8 illustrates a flowchart for a procedure of write processing.

In step 203 in FIG. 7, the request processing portion 115 determines whether there is a write request to write data to the original setting information DB 50 from the requester 59. If there is a write request, the request processing portion 115 passes the request to the write processing portion 111, and the process proceeds to step 205. If there is no write request, the process proceeds to step 207. In step 205, the write processing portion 111 writes data to the administrative setting information DB 101, instead of writing the data to the original setting information DB 50. FIG. 8 is a flowchart illustrating a procedure of the write processing.

In step 251 in FIG. 8, the write processing portion 111 refers to the white list 103 to see whether the white list 103 registers therein a record of which items all match the process name, file size, file path, and version information acquired from the write request from the requester 59. In step 253, the write processing portion 111 registers data in the time-series data block 151 in the form of a time-series data unit 151n shown in FIG. 4B. At this time, in the case where it has been determined in the above comparison of the contents of the time-series data unit 151n with the records in the white list 103 that there is a completely matching record in the white list 103, the write processing portion 111 describes the term "known", indicating that the writing has been performed by a safe process, in the field of "registration in white list" in the time-series data unit 151n. In the case where there is no such record in the white list 103, the write processing portion 111 describes, in that field, the term "unknown" indicating that the writing has been performed by a potentially hazardous process.

In step 255, the write processing portion 111 refers to the update data block 153 to see whether the write request is an update of the setting value for a key path that has already been registered. If the write request is an update of the setting value for the already registered key path, the process proceeds to step 257, in which the write processing portion 111 registers in the setting value history block 155 a new setting value so as to be linked by a pointer to the latest one of the setting values already registered in the setting value history block 155. In step 259, the write processing portion 111 replaces the value set in the "setting value" field in the update data block 153 with the new setting value.

In the case where the write processing portion 111 determines in step 255 that the write request involves registration of new key data, in step 261, the write processing portion 111 registers the key data in the update data block 153. According to the write processing procedure described above, the latest update data for the original setting information DB 50 is registered in the time-series data block 151 and the update data block 153 in accordance with their data structures. The read processing portion 113, on receipt of a read request, searches the update data block for a latest setting value.

Figure 9:
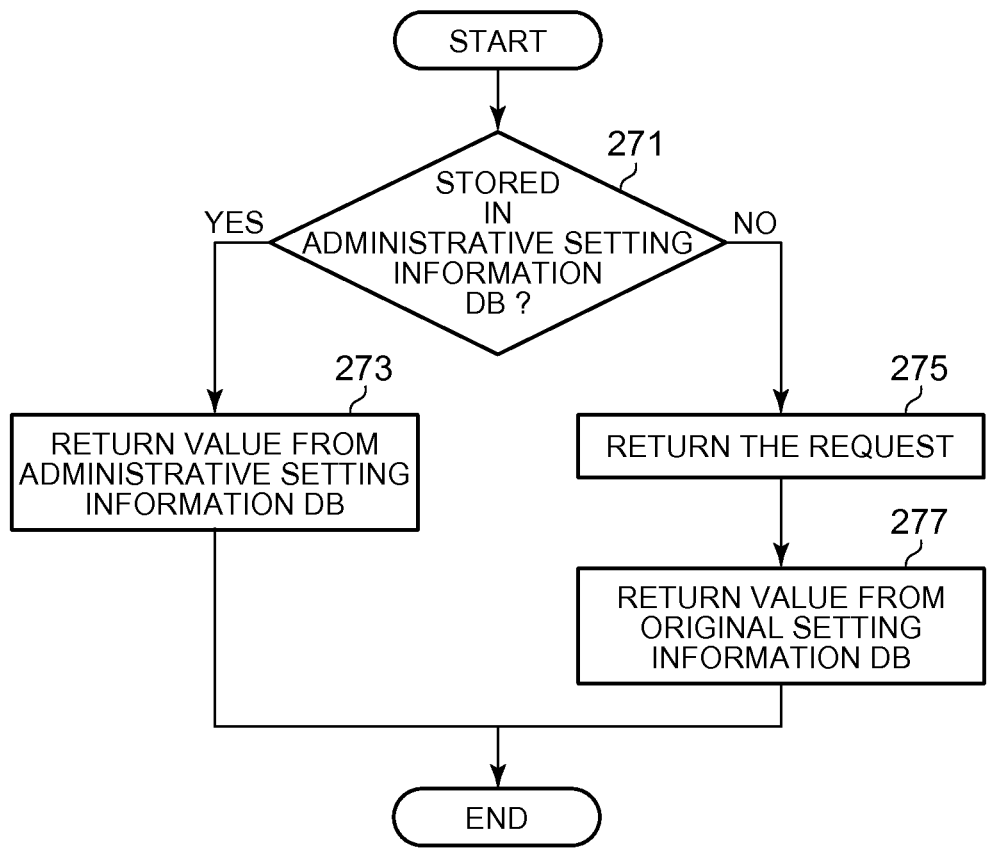
FIG. 9 illustrates a flowchart for a procedure of read processing.

Returning to FIG. 7, in step 207, the request processing portion 115 determines whether there is a read request to read data from the original setting information DB 50 from the requester 59. If there is a read request, the request processing portion 115 passes the request temporarily to the read processing portion 113, and the process proceeds to step 209. If there is no read request, the process proceeds to step 211. FIG. 9 is a flowchart illustrating a procedure of the read processing. In step 271, the read processing portion 113 determines whether a setting value associated with the read request is registered in the update data block 153. If so, the process proceeds to step 273, in which the read processing portion 113 returns the latest setting value in the update data block 153 to the requester 59 via the request processing portion 115.

If the setting value associated with the request is not registered in the update data block 153, the process proceeds to step 275, in which the read processing portion 113 returns the read request to the request processing portion 115. In step 277, the request processing portion 115 passes the read request to the original setting information DB 50, to cause the setting value to be returned from the original setting information DB 50 to the requester 59. Returning to FIG. 7, in step 211, the editing portion 105 determines whether there is a request to clean up the administrative setting information DB 101 from the user interface 107 or the system state monitoring portion 109.

In the administrative setting information DB 101, a large number of pieces of key data are registered over the operating time of the computer system 10, and the computer system 10 reads the key data for operating. In the administrative setting information DB 101, the key data about the application that has been removed may be left undeleted, or there may be illegal key data that has been registered by malware. Such a setting may not be used, or the illegal setting value may cause the computer system 10 to operate unstably. As used herein, the term "cleanup" means that unnecessary key data in the administrative setting information DB 101 is removed and replaced with legal key data. Embodiments describe cleanup processing as not only removing unnecessary key data but changing the legal key data that has been registered.

If the editing portion 105 recognizes the need for a cleanup, the process proceeds to step 213, in which the editing portion 105 executes cleanup processing. The editing portion 105 determines that cleanup processing is necessary in accordance with the cleanup request from the user interface 107 or the system state monitoring portion 109.

Figure 10:
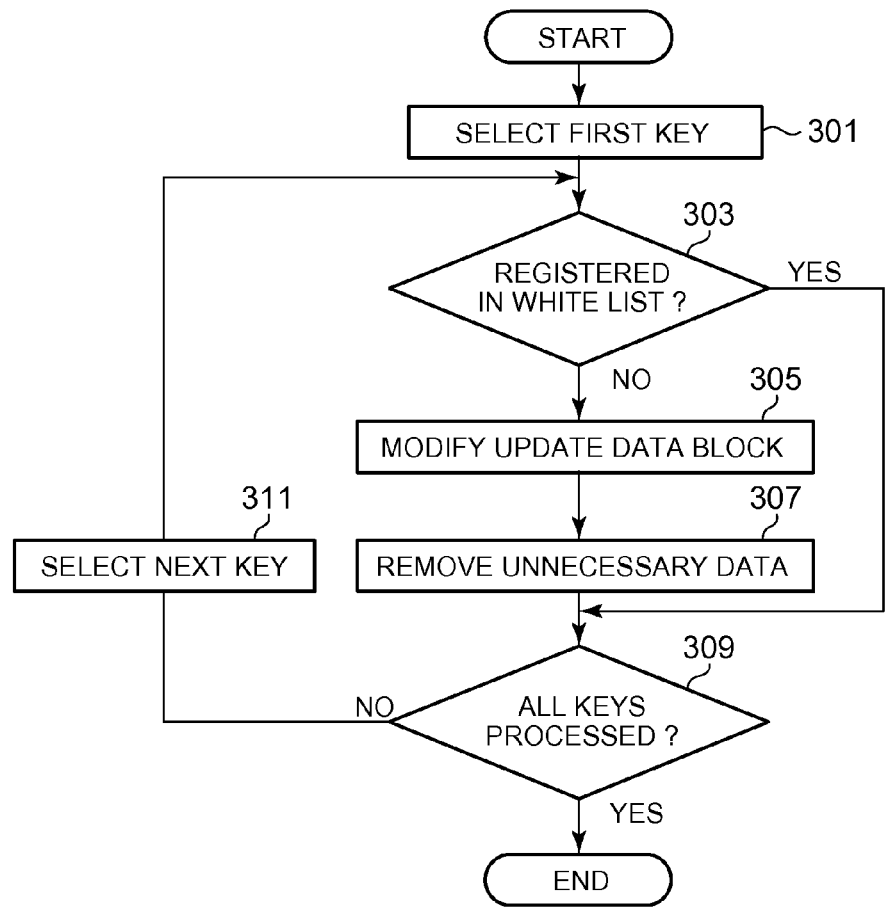
FIG. 10 illustrates a flowchart for a procedure of cleanup processing.

FIG. 10 is a flowchart illustrating a procedure for cleanup processing. In step 301, the editing portion 105 selects key data on the list registered in the update data block 153. In step 303, the editing portion 105 searches the time-series data block 151 for the time-series data units 151n related to the same key path backward in time from the newest one, to locate a latest time-series data unit having the term "known" described in the field of "registration in white list". Then, the editing portion 105 selects the latest time-series data unit 151n with the term "known" described therein. In step 305, the editing portion 105 replaces the value set in the "setting value" field in the update data block 153 with the value registered in the selected time-series data unit 151n. In step 307, the editing portion 105 deletes from the time-series data block 151 any time-series data units 151n having the term "unknown" described therein that have been registered for the same path later than the selected, latest time-series data unit 151n with the term "known" described therein. The editing portion 105 searches the setting value history block 155, using the GUID, for the entries corresponding to the deleted time-series data units 151n, and removes all the detected entries.

In step 309, the editing portion 105 determines whether the processes from step 303 to step 307 are finished for all the key paths registered in the update data block 153. If not, the process proceeds to step 311, in which the editing portion 105 selects a next key path to repeat the same processes. The cleanup processing is finished when the values in the "setting value" field for all the key paths in the update data block 153 have been replaced with the values accompanied by the term "known" in the time-series data units 151n. Thus, upon completion of the cleanup process, all the setting values registered in the update data block 153 are written by processes generated by trusted programs. As a result, any cause of an unstable system included in the administrative setting information DB 101 can be removed therefrom.

The cleanup processing according to the above procedure is simple and takes a short time because it only replaces the setting value in the update data block 153 with a value that has been written by a process guaranteed by the white list 103. Returning to FIG. 7, in step 215, a user determines whether it is necessary to initialize the administrative setting information DB 101 in order to reset the computer system 10 to its factory defaults, and enters the decision using the editing portion 105 via the user interface 107. It is here assumed that the user determines that initialization is necessary when the system falls into a seriously unstable state and the user determines that the system cannot be restored using the cleanup processing.

Upon receipt of an initialization instruction from the user interface 107, in step 217, the editing portion 105 deletes all the data in the time-series data block 151, the update data block 153, and the setting value history block 155. At this time, the editing portion 105 may delete only the data related to a category associated with a specific problem, including but not limited to, a driver, service, security, or an application, among the key paths. When initialization is performed for a specific category, uninitialized key data under the categories having no problem can be maintained. Once the initialization is performed, the subsequent read request is addressed by returning the setting value from the original setting information DB 50, while data is written into the administrative setting information DB 101.

In step 219, the user interface 107 displays a popup screen on the LCD 19, at intervals of about a week, in one non-limiting example, to inquire whether to update the white list 103. When the user determines that the recent behavior of the computer system 10 is normal, the user can instruct an update of the white list 103 to the editing portion 105 via the user interface 107. Alternatively, the system state monitoring portion 109 may instruct an update of the white list 103 to the editing portion 105 in the case where it has detected no abnormal system condition over a predetermined period.

Upon receipt of the instruction to update the white list 103, in step 221, the editing portion 105 adds, for each key data, the process corresponding to the time-series data unit 151n having the term "unknown" registered therein and having the latest setting value registered in the update data block 153, to the white list 103. This causes these processes to be regarded as safe. The next time a clean up process is requested, these safe processes are used to determine which setting values should be cleaned up. When an operation for shutting down the computer system 10 is performed in step 223, in step 225, the data in the administrative setting information DB 101 is stored in the HDD 17 before the shutdown.

While the method of cleaning up the administrative setting information DB 101 on the basis of the white list 103 has been described above, its approach is opposite from that of the conventional method of performing the cleanup on the basis of a black list, making the method advantageous over the conventional method. It will be appreciated that in the method of performing the cleanup using a white list, only the trusted processes are registered in the first place, and subsequently, only the process that is trusted by the computer system 10 or the user is registered. Checking reliability of a process that is introduced as a result of an update of the administrative setting information DB 101 in an individual computer system will require a certain amount of time after registration of the setting information.

According to embodiments, writing of data into the administrative setting information DB 101 is permitted provisionally in response to each write request. The writing at that time however is executed by a process that has not been registered in the white list 103, and thus, evaluation of the reliability is put on hold. The process is registered in the white list only in the case where the user or the system has confirmed that the process can be trusted after checking the operating state of the computer. In the case where the computer operates unstably before the user or the system confirms the reliability of the process, the data can be restored to the setting information that had been written by the trusted process. Accordingly, embodiments enable a prompt action, unlike the method using the black list in which data of the black list needs to be acquired from another person for taking measures. Further, embodiments can address situations where there is a process that has not been described in the black list but would likely cause a malfunction of the system. Furthermore, according to embodiments, not only a defective setting value can be removed, but also the setting value can be put back to the setting value that had no problem in the past.

The setting information database described above is not limited to the registry used by the Windows (registered trademark) OS. It is applicable to databases used by various OSs for storing setting information, including but not limited to ODM (Object Data Manager) of AIX (registered trademark), Sun Service Registry 3.1 of Sun Microsystems Inc., and a registry of OpenVMS (Open Virtual Memory System). In these OSs as well, in the case where various processes access the setting information database, the administrative setting information DB and the white list may be used for managing an update. This facilitates initialization and cleanup, and also makes it possible to quickly avoid an unstable system operation caused by tampering.

While embodiments have been described above in conjunction with the specific embodiments shown in the accompanying drawings, this is non limiting, and any configuration known to date can be adopted as long as it produces the effects described herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those particular descriptions, and that various other changes and modifications may be affected therein by one skilled in the art without departing from the scope or spirit of the disclosure.

What is claimed is:

1. A computer program product comprising:
   a computer readable storage medium having computer readable program code embodied therewith, the computer readable program code comprising:
   computer readable program code configured to provide an administrative database capable of storing setting information of a computer system;
   computer readable program code configured to, responsive to reception of each write request to write data to a setting information database of the computer system, append write data of each write request to the administrative database instead of writing the data to the setting information database; and
   computer readable program code configured to, responsive to reception of a read request to read data from the setting information database, provide read data from the administrative database responsive to a determination that the administrative database includes the read data therein;
   wherein said setting information comprises operating system registry information.

2. The computer program product according to claim 1, wherein to provide read data includes providing the read data from the setting information database responsive to a determination that the administrative database does not include the read data.

3. The computer program product according to claim 1, further comprising computer readable program code configured to provide a white list having registered therein one or more trusted programs having access to the setting information database;
   wherein responsive to reception of each write request from a program to write data to a setting information database of the computer system, information as to whether the program is registered in the white list is written into the administrative database.

4. The computer program product according to claim 3, further comprising:
   computer readable program code configured to receive an update request to update the white list; and
   computer readable program code configured to, responsive to receipt of the update request, register in the white list a program that has written the write data to the administrative database and that has not been registered in the white list.

5. The computer program product according to claim 4, wherein to receive an update request to update the white list includes receiving an instruction from a user who has used the computer for a predetermined period.

6. The computer program product according to claim 4, wherein to receive an update request to update the white list includes the step of receiving an instruction from a system that monitors the computer for an unstable operation.

7. The computer program product according to claim 3, further comprising computer readable program code configured to:
   receive a cleanup request to clean up the administrative database; and
   remove from the administrative database any data that has been written by a program not registered in the white list.

8. The computer program product according to claim 7, wherein to receive a cleanup request includes receiving an instruction from a user who has used the computer for a predetermined period.

9. The computer program product according to claim 7, wherein to receive a cleanup request includes receiving an instruction from a system that monitors the computer for an unstable operation.

10. The computer program product according to claim 1, further comprising computer readable program code configured to:
    receive an initialization request to initialize the administrative database; and
    remove any data classified as a specific category among data written into the administrative database.

11. A computer system, comprising:
    one or more processors;
    a system memory operatively connected to the one or more processors;
    a setting information database for storing key data the key data including a key path and a setting value for the key path;
    an administrative database for storing updated key data in correspondence with the key data stored in the setting information database;
    a plurality of requesters configured to access the setting information database; and
    a write processing module configured to write key data to the administrative database on receipt of a write request to write data to the setting information database issued from one of the plurality of requesters;
    wherein said key data comprises operating system registry key data.

12. The computer system according to claim 11, further comprising a read processing module configured to receive a read request for a key path in the setting information database issued from the requester, the read processing module configured to determine whether a setting value corresponding to the key path is stored in the administrative database, and further configured to read the value from the administrative database responsive to a determination that the value is stored therein.

13. The computer system according to claim 11, further comprising a white list having registered therein a trusted requester in terms of an access to the setting information database, wherein the write processing module is configured to write information as to whether the requester is registered in the white list, together with the key data, to the administrative database.

14. The computer system according to claim 13, further comprising an editing module configured to delete any setting value that has been written into the administrative database by a requester not registered in the white list on receipt of a cleanup request to clean up the administrative database.

15. The computer system according to claim 14, further comprising a system state monitoring module configured to monitor the computer system for an unstable operation and send a cleanup request to the editing module.

16. The computer system according to claim 14, wherein, upon receipt of an initialization request, the editing module is configured to remove any key path and any setting value belonging to one of: a driver, a service, a security, or an application.

17. A method comprising:
    operating one or more processors to:
    provide an administrative database capable of storing setting information of a computer system;

responsive to reception of each write request to write data to a setting information database of the computer system, append write data of each write request to the administrative database instead of writing the data to the setting information database; and responsive to reception of a read request to read data from the setting information database, provide read data from the administrative database responsive to a determination that the administrative database includes the read data therein;

wherein said setting information comprises operating system registry information.

18. The method according to claim 17, wherein to provide read data includes providing the read data from the setting information database responsive to a determination that the administrative database does not include the read data.

19. The method according to claim 17, further comprising:
providing a white list having registered therein one or more trusted programs having access to the setting information database;
wherein responsive to reception of each write request from a program to write data to a setting information database of the computer system, operating the one or more processors to write information as to whether the program is in the white list into the administrative database.

20. The method according to claim 19, further comprising:
receiving an update request to update the white list; and
responsive to receipt of the update request, operating the one or more processors to register in the white list a program that has written the write data to the administrative database and that has not been registered in the white list.

* * * * *